1,982,221

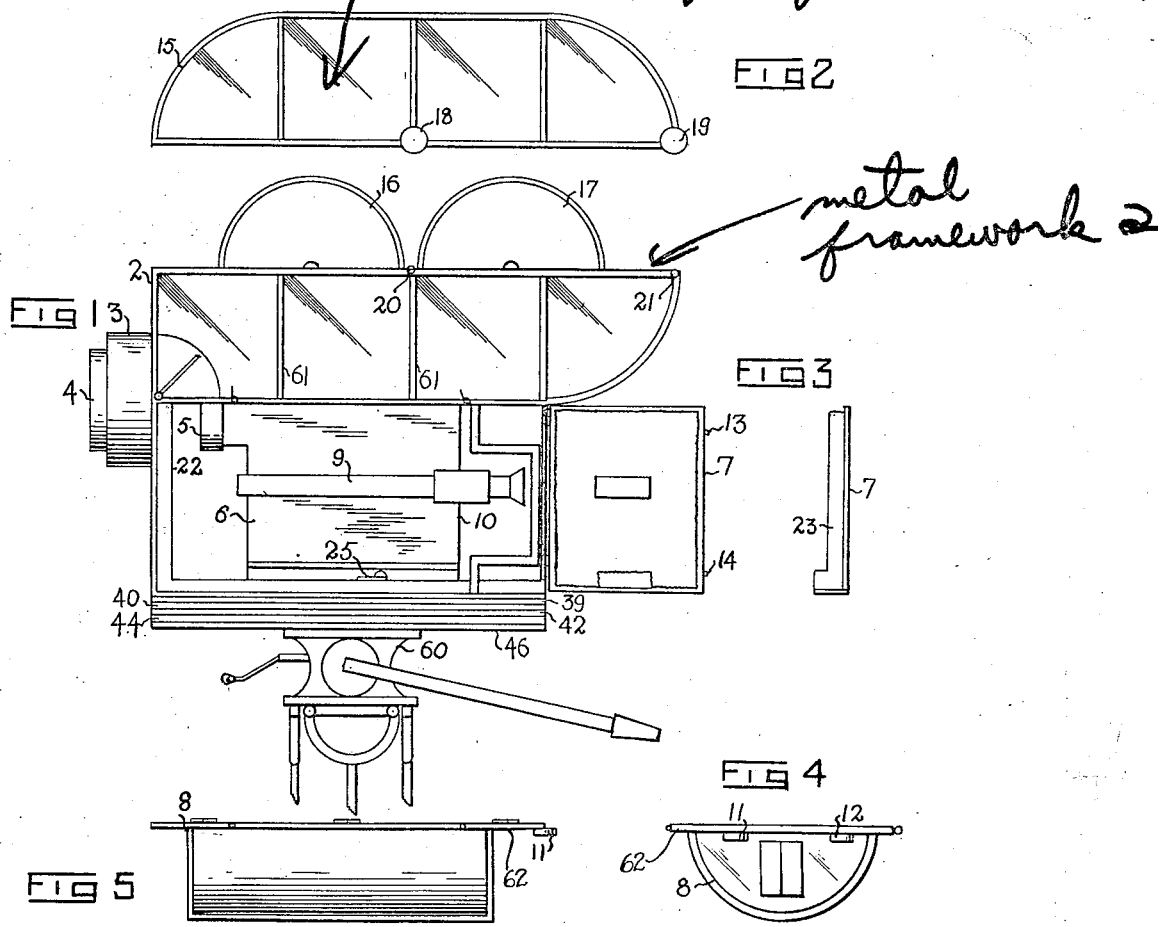
Nov. 27, 1934.   C. E. McCLAY   1,982,221
SOUNDPROOF CASING FOR MOTION PICTURE CAMERAS
Filed Oct. 10, 1932   2 Sheets-Sheet 1
INVENTOR:
Charles E. McClay.
BY W. E. Beatty
ATTORNEY Nov. 27, 1934.         C. E. McCLAY         1,982,221
SOUNDPROOF CASING FOR MOTION PICTURE CAMERAS
Filed Oct. 10, 1932    2 Sheets-Sheet 2
*air space*
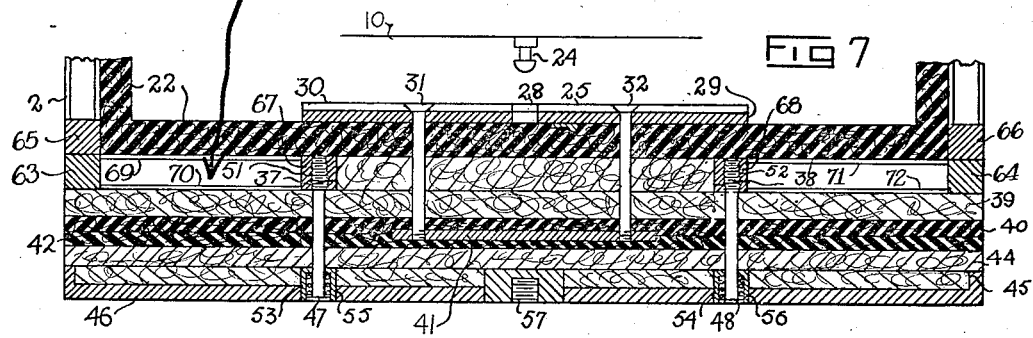
FIG 7
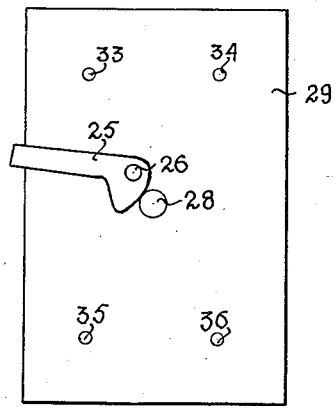
FIG 8
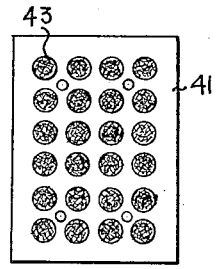
FIG 9
FIG 10
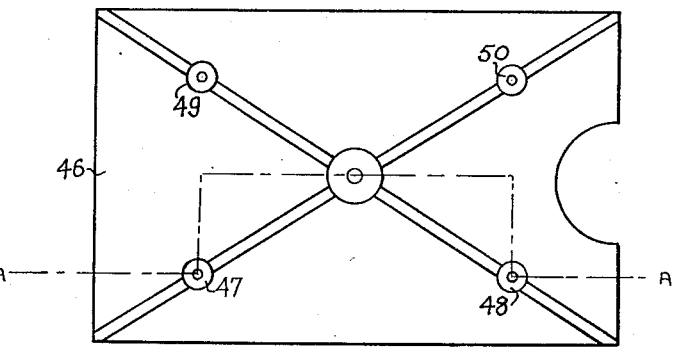
INVENTOR:
CHARLES E M°CLAY.
BY
W E Beatty
ATTORNEY Patented Nov. 27, 1934

UNITED STATES PATENT OFFICE 1,982,221

SOUNDPROOF CASING FOR MOTION PICTURE CAMERAS

Charles E. McClay, Los Angeles, Calif., assignor to United Research Corporation, Long Island City, N. Y., a corporation of Delaware Application October 10, 1932, Serial No. 637,063

8 Claims. (Cl. 248—16)

This invention relates to a sound proof casing for a motion picture camera, and more particularly to a means and method of resiliently mounting a sound proof casing on a supporting member adapted to be attached to a tripod head or other support.

In the past, attempts have been made to solve the problem of undesirable noise produced by a camera, while making a sound motion picture, by providing various forms of sound proof housings, for the camera and its motor, which were attached to the tripod head.

These forms of sound proof housing were undesirable in that they were complete casings, usually metallic, attached directly to the tripod head, and consequently any vibrations set up within the casing by the camera or otherwise, were transmitted directly to the tripod and from there into undesirable sonic vibrations which reached the recording microphone, producing an unpleasant sound record.

The principal object of this invention is to resiliently mount a sound proof casing for a motion picture camera so that there is no metallic connection between the camera casing and the tripod head.

Another object of the invention is to independently resiliently support a camera and a sound proof casing therefor, from a supporting member.

Still another object of the invention is to mount a sound proof casing for a motion picture camera on a tripod head or other support, whereby the casing and camera may be slightly moved relatively to the tripod head although substantially fastened thereto.

These objects are accomplished by providing resilient members for independently resiliently supporting the camera and the sound proof casing from a base plate, that is adapted to be attached to a tripod head or other support.

Other objects and structural details of this invention will be apparent from the following description when read in conjunction with the accompanying drawings, wherein:

Figure 1 is a side elevation of the sound proof casing of this invention in an open position with various parts removed therefrom.

Figure 2 is a side elevation of the detachable film reel casing.

Figure 3 is an end elevation of an inspection door shown in Figure 1.

Figure 4 is an end elevation of the side covering of the sound proof casing.

Figure 5 is a side elevation of Figure 4.

Figure 6 is a perspective view of the sound proof casing embodying the invention.

Figure 7 is a side elevation in cross section showing the construction of the base of the sound proof casing taken along the line AA of Figure 10.

Figure 8 is a plan view of the locking plate used to hold the camera in position inside the casing.

Figure 9 is a plan view of the floating plate of this invention.

Figure 10 is a plan view of the base plate of the sound proof casing.

The casing 1 comprises primarily a metal framework 2 provided with ribs or struts 61 to add strength to the skeleton framework. Mounted on the forward edge of the frame 2 is a projecting circular frame 3 provided with an extension 4, having an opening therein closed by an optical glass window (not shown). The extension 4 may be reciprocated in order to move the window towards or away from the lens 5 of the camera 10, as it is desirable for the lens to be as close as possible to the window 4 to overcome distortion.

Hinged to the rear edge of frame 2 is an inspection door 7. Hinged for movement about a horizontal axis along the lower edge of casing 1, is a door 62 having a semi-cylindrical side frame 8 which serves to house the view-finder 9. The rear edge of door 62 is provided with two eccentric locking screws 11 and 12 adapted to engage pins 13 and 14 mounted on the free edge of the door 7, in order to lock doors 7 and 62 in their closed position (Fig. 6). A detachable frame 15 provides convenient access to the film magazines 16 and 17. Eccentric locking screws 18 and 19 mounted on the lower edge of frame 15 engage pins 20 and 21 on the framework 2 in order to lock frame 15 in its closed position.

The openings in the various frames of the casing are sealed with sheets of cellulose acetate and the whole of the casing and its associated parts are lined with strips of thick sponge rubber as shown at 22 and 23. This lining of rubber is slightly larger than the edges of the frames so that when the casing is closed, the various pieces of contacting rubber are pressed together and form a tight gasket-like joint, thus rendering the casing substantially air-tight.

The base of the camera 10 is provided with an annular pendant button 24 which drops into an aperture 28 in a camera supporting plate 29. Camera 10 is locked by means of a lever 25, journaled to the underside of plate 29 at a point 26 about which it pivots, and having an eccentric cam face which engages a groove in button 24 and locks the camera firmly in place. Plate 29, which may be of duralumin, is covered with a coating of hard leather 30 and rests on the sponge rubber 22 which lines casing 1 as shown in Figure 7.

The bottom of the casing 1 comprises outer metallic struts 63, 64 flush with the outer walls of the casing 1 and suitably fastened to similar wall struts 65, 66, for example, by being cemented thereto with cellulose acetate. The bottom of the casing 1 also comprises a plurality of metallic struts 67, 68 arranged in a horizontal plane with the struts 63 and 64. The struts 63 and 67 have sheets of cellulose acetate 69 and 70 connected thereto as shown, to form an air space between these sheets. The struts 64 and 68 are similarly provided with sheets of cellulose acetate 71, 72. The struts 63, 64, 67, and 68 with the sheets 69, 70, 71, and 72 constitute the bottom wall member of the casing 1. No such sheets are provided between the struts 67 and 68, whereby an aperture 37 is provided between the struts 67 and 68. This aperture 37 makes it possible to provide resilient material between the base plate 46 and the camera plate 29, whereby the camera is resiliently supported within the casing 1, and the casing 1 with its resiliently supported camera is in turn resiliently supported above the base plate 46. To this end, the aperture 37 is closed by a strip of felt 38 under the major portion of the sponge rubber 22 which lies underneath the camera plate 29. Extending the full width of the camera casing underneath the struts 63, 67, 68, 64 is a strip of felt 39. Beneath the strip of felt 39 are two layers of sponge rubber 40, 42 and between the latter and the base plate 46 are two strips of felt 44 and 45.

A floating plate 41 is supported between two strips of sponge rubber 40 and 42. A series of apertures 43 in the plate 41 are filled with felt to eliminate the possibility of any vibration being set up therein. Machine screws, such as shown at 31 and 32, interconnect the floating plate 41 and the camera supporting plate 29. The receptive apertures for these screws in the plate 29 are shown at 33—34—35—36 (Fig. 8). Tension or compression is imparted to the various strips of sound absorbing materials 39—40—42—44—45 by means of the screws 47—48—49 and 50 which project from the supporting plate 46 and mate with suitable apertures in the frame 2 as shown at 51 and 52. These screws 47—48—49—50 are resiliently mounted, by means of helical wire springs, 53 and 54 which surround them, in recessed projections such as 55 and 56 in the plate 46. A screw threaded aperture 57 in the plate 46 is adapted to be attached to the top of any conventional tripod head 60.

Thus it will be seen that a sound proof casing for a motion picture camera is provided wherein independent resilient means are utilized to support the camera and the casing.

The casing is substantially fastened to a tripod head, yet it may be slightly moved relatively thereto as permitted by the springs 53 and 54. Any vibrations set up by the camera, or its motor, or otherwise, are thus completely absorbed before they are transmitted to the tripod and from thence into sonic vibrations.

Having thus described the invention, what is claimed as new and desired to secure by Letters Patent is:

1. An attachment for a sound proof camera casing for resiliently supporting a camera within said casing, comprising the combination of a camera plate within said casing for supporting the camera, a metallic bottom wall member, resilient means below said member for supporting said camera plate, and means fastened to said member for retaining said resilient means in position.

2. An attachment for a sound proof camera casing for resiliently supporting a motion picture camera within the casing, comprising the combination of a camera plate within the casing, said casing having a metallic bottom wall member, and resilient means outside of said bottom wall member for supporting said plate.

3. A sound proof camera casing comprising the combination of a camera plate within the casing, said casing having a metallic bottom wall member, a floating plate below said member, means for fastening said camera plate to said floating plate, and resilient means below said member and at opposite sides of said floating plate.

4. A sound proof camera casing comprising the combination of a camera plate within said casing, said casing having a metallic bottom wall member, a floating plate below said member, means for connecting said camera plate to said floating plate, resilient means between said camera plate and said floating plate, resilient means at opposite sides of said floating plate, a tripod plate, and fastening means extending between said member and said tripod plate for compressing said last-mentioned resilient means.

5. A sound proof camera casing comprising the combination of a camera plate within said casing, said casing having a metallic bottom wall member, a floating plate below said member, means for connecting said camera plate to said floating plate, resilient means between said camera plate and said floating plate, resilient means at opposite sides of said floating plate, a tripod plate, and means for resiliently connecting said tripod plate to a portion of said member for compressing said second-mentioned resilient means.

6. The combination of a sound proof camera casing having a skeleton metallic framework, a camera plate within said casing, a tripod plate, means for resiliently connecting said tripod plate to a portion of said framework, and resilient means between said tripod plate and said camera plate.

7. The combination of a sound proof camera casing having a horizontal frame member, a camera plate, resilient means between said plate and said member, a tripod plate, means for attaching said tripod plate to a portion of said casing, and resilient means above said tripod plate for resiliently supporting the portion of said casing thereabove and the camera.

8. The combination of a sound proof camera casing, a tripod plate, means for resiliently connecting said tripod plate to a portion of said casing, and resilient means above said tripod plate for resiliently supporting said casing and the camera.

CHARLES E. McCLAY.